United States Patent
Sizelove et al.

(10) Patent No.: US 6,638,390 B1
(45) Date of Patent: Oct. 28, 2003

(54) GEAR PRODUCTION PROCESS

(75) Inventors: Bradley J Sizelove, Saginaw, MI (US); Steven J Schultz, Saginaw, MI (US); David E. Witucki, Bay City, MI (US); Todd Fredrick Jammer, Birch Run, MI (US); William W Heminghous, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 159 days.

(21) Appl. No.: 09/729,385

(22) Filed: Dec. 4, 2000

Related U.S. Application Data

(60) Provisional application No. 60/168,886, filed on Dec. 3, 1999.

(51) Int. Cl.[7] .............................. B29C 65/46; B29C 65/54
(52) U.S. Cl. .................. 156/303.1; 156/86; 156/307.7; 29/893; 29/893.3; 29/893.36; 29/893.37; 29/446
(58) Field of Search .................... 156/86, 215, 293, 156/303.1, 307.7; 29/446–447, 448, 450, 893, 893.3, 893.31, 893.33, 893.36, 893.37; 57/406

(56) References Cited

U.S. PATENT DOCUMENTS

| | | | | |
|---|---|---|---|---|
| 2,111,590 A | * | 3/1938 | Hoof | 74/445 |
| 4,078,445 A | * | 3/1978 | Kiser, Jr. | 474/150 |
| 4,490,074 A | * | 12/1984 | Chaiko | 405/259 |
| 4,913,688 A | * | 4/1990 | Bekheet | 474/174 |
| 5,221,133 A | * | 6/1993 | Braun et al. | 384/549 |
| 5,224,903 A | * | 7/1993 | Langhof et al. | 474/152 |
| 5,588,325 A | * | 12/1996 | Green et al. | 74/15.63 |
| 6,016,649 A | * | 1/2000 | Bock et al. | 57/406 |
| 6,068,241 A | * | 5/2000 | Meyer | 254/390 |

FOREIGN PATENT DOCUMENTS

| | | | | |
|---|---|---|---|---|
| EP | 0074241 A1 | * | 9/1982 | F16H/55/17 |
| JP | 1026270 | * | 1/1998 | F16L/17/00 |

* cited by examiner

*Primary Examiner*—Jeff H. Aftergut
*Assistant Examiner*—Todd J. Kilkenny
(74) *Attorney, Agent, or Firm*—Michael D. Smith

(57) ABSTRACT

A process for manufacturing polymer/metal disks in a single piece batch size comprises applying a bonding agent to a metallic hub, pressing a polymeric ring over the metallic hub to form a ring/hub assembly, and heating the ring/hub assembly to cause bonding to occur between the polymeric ring and the metallic hub. The bonding agent may either be sprayed or applied directly to the metallic hub. Other methods of application may also be employed, such as dipping of the metallic hub in the bonding agent. The bonding agent is generally an organosilane, although other compounds capable of bonding a polymer to a metallic substrate can be used. The pressing of the polymeric ring over the metallic hub comprises enlarging the polymeric ring and mounting it over the metallic hub. The enlargement of the polymeric ring is typically effectuated either with heat or by stretching. The application of heat to the ring/hub assembly softens a surface layer of the polymeric ring to allow the softened polymer to flow into a textured surface of the metallic hub and harden, thereby retaining the polymeric ring on the metallic hub.

20 Claims, 1 Drawing Sheet

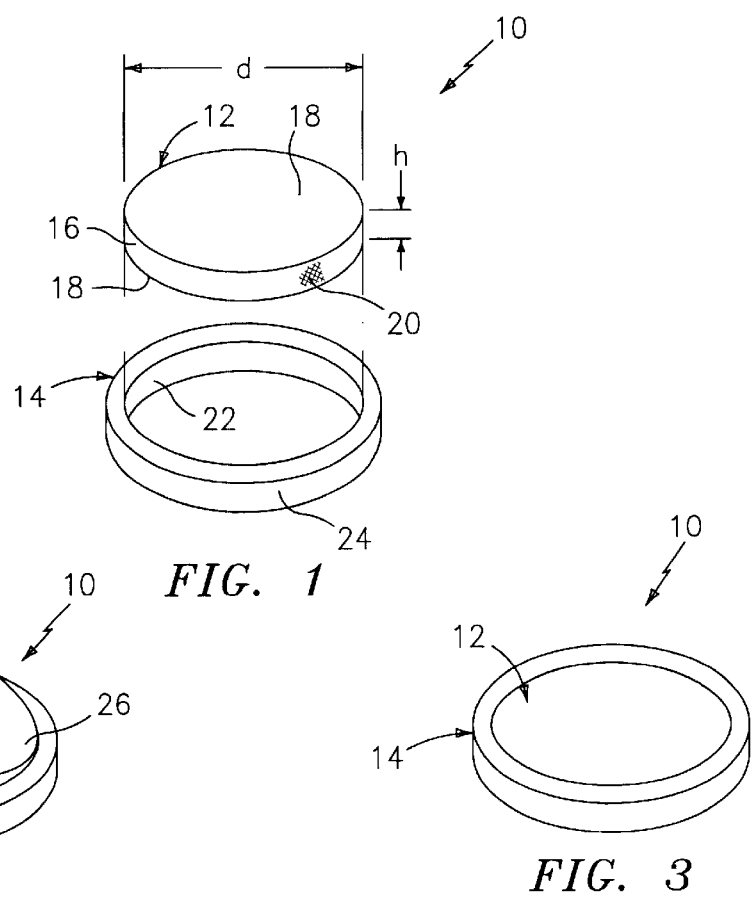
FIG. 1
FIG. 2
FIG. 3
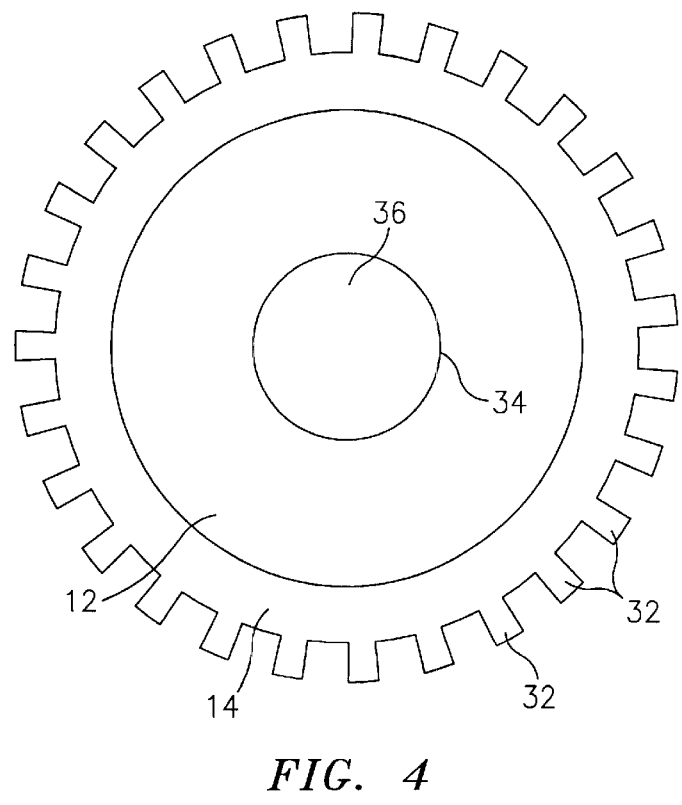
FIG. 4

GEAR PRODUCTION PROCESS

CROSS REFERENCE TO RELATED APPLICATION

This application claims the benefit of U.S. Provisional Patent Application No. 60/168,886, filed Dec. 3, 1999, the content of which is incorporated herein by reference in its entirety.

TECHNICAL FIELD

This disclosure relates to the bonding of polymer rings to metallic hubs, and, more particularly, to a process for manufacturing polymer/metal disks that are capable of being machined.

BACKGROUND

Various items (including gears, cam lobes, spacers, washers, flywheels, bushings, and pulleys) having a polymeric outer edge disposed around a metallic hub have previously been formed by multiple piece "batch" processing methods. One method of multiple piece batch processing has heretofore involved adhesively disposing a tube of polymeric material over a steel billet to form a stock piece. The stock piece, which typically ranges in length from about six inches to about thirteen inches, is then sliced perpendicular to a longitudinal axis extending therethrough to produce disks of certain thicknesses having a polymeric ring disposed around a steel hub. Because of the variation in the degree of adhesion of the polymeric tube over the length of the steel billet, the degradation of the polymeric material, and the dimensional instability associated with cutting the stock piece to produce thin slices that are subsequently machined into finished pieces, the quality of finished pieces produced by such a method is generally poor. Furthermore, the opposing ends of the stock piece, or tailstocks, are usually scrapped. Moreover, the actual cutting of the stock piece results in lost material at the points at which the cuts are made. Scrapping of the tailstocks, the generation of "sawdust" waste as a result of the cutting of the stock piece, and the proper disposal of all of the generated waste are factors that increase the cost of producing the finished pieces.

One method of single piece batch processing involves the casting of a polymer, such as nylon, directly onto a structural hub. Because in single piece casting methods each individual polymeric member must be separately molded onto the hub, time and space constraints typically hinder the manufacture of pieces by such a method. Additionally, during the solidification of the material, very high shrinkage occurs which results in high levels of undesirable residual stresses. These residual stresses are undesirable for strength and dimensional stability.

An additional method of single piece batch processing involves the injecting of a polymer, such as nylon, directly onto a structural hub using injection-molding techniques. Because in single piece injection molding methods each individual polymeric member must be separately injected onto the hub, materials are limited to those that are capable of being injection molded. Additionally, there are many attributes of injection molding that are undesirable, such as internal shrinkage porosity, knit lines, and anisotropic material behavior that could be undesirable for many applications.

SUMMARY

A process for manufacturing machinable polymer/metal disks is disclosed herein. The process utilizes a single piece batch size concept that allows a ring/hub assembly to be efficiently produced for finishing into any one of a number of items. The process comprises applying a bonding agent to a metallic hub, pressing a polymeric ring over the metallic hub to form a ring/hub assembly, and heating the ring/hub assembly to cause bonding to occur between the polymeric ring and the metallic hub. The bonding agent is typically sprayed onto the metallic hub. Other methods, such as dipping of the metallic hub into the bonding agent or direct application of the bonding agent to the surfaces of the metallic hub, can also be employed. The bonding agent is generally an organosilane, although other compounds capable of bonding a polymer to a metallic substrate can be used. The pressing of the polymeric ring over the metallic hub typically comprises enlarging the polymeric ring either with heat or by stretching (or a combination of both heating and stretching) and mounting the enlarged polymeric ring over the metallic hub. The heating of the ring/hub assembly effectuates the softening of a surface layer of the polymeric ring to allow the softened polymer to flow into a textured surface of the metallic hub and harden, thereby retaining the polymeric ring on the metallic hub.

The foregoing process provides a practical solution to the problems associated with methods for manufacturing the polymer/metal disks of the related art. In particular, the single piece batch size manufacture of the polymer/metal disks allows near-zero rejection rates to be realized, utilizes less energy, and allows for the use of various types of polymeric materials and metallic hub designs to create a cost effective and high quality polymer/metal disk assembly that meets or exceeds the design specifications imposed for the manufacture of a finished product. Single piece manufacturing furthermore allows access to the process for the incorporation of monitoring equipment (e.g., temperature measurement devices and visual inspection instrumentation) to further promote process repeatability and provide opportunity for closed loop conditioning of the finished piece after the heating cycle is complete.

BRIEF DESCRIPTION OF THE DRAWINGS

FIG. 1 is a perspective exploded view of a polymeric ring disposed on a metallic hub.

FIG. 2 is a perspective view of a polymeric ring being stretched so as to be mounted on a metallic hub.

FIG. 3 is a perspective view of a finished ring/hub assembly.

FIG. 4 is a plan view of a finished gear cut from a ring/hub assembly.

DETAILED DESCRIPTION

A process for manufacturing a blank from which a gear or other piece can be machined (if desired) is disclosed herein. The process comprises bonding a polymeric ring to a metallic hub. The bonding is effectuated by pressing the polymeric ring over the metallic hub to form a ring/hub assembly, and heating the ring/hub assembly to effectuate the bonding of the polymeric ring to the metallic hub. Heat may be applied to the polymeric ring in order to cause the polymeric ring to expand, thereby facilitating the pressing of the polymeric ring onto the metallic hub. Once the ring/hub assembly is formed, the teeth can be machined into an outer edge of the polymeric ring to form the finished gear.

Referring now to FIG. 1, the ring/hub assembly is shown generally at 10. Ring/hub assembly 10 comprises the metallic hub, shown generally at 12, and the polymeric ring, shown generally at 14. Metallic hub 12 is typically a cylindrical member having a continuous edge surface 16 and opposing face surfaces 18 disposed adjacent to continuous edge surface 16. Continuous edge surface 16 defines a thickness h of metallic hub 12 and provides a surface on which polymeric ring 14 can be pressed and mounted. Texturing 20 or some type of mechanical attachment (not shown) may be disposed over substantially all of continuous edge surface 16 to provide a surface that is particularly resistant to circumferential and axial slippage of polymeric ring 14 and to provide a surface conducive to the setting and curing of a bonding agent disposed between polymeric ring 14 and metallic hub 12. The mechanical attachment may comprise knurls, splines, or a similar type of structure capable of providing an interlocking feature between polymeric ring 14 and metallic hub 12. Face surfaces 18 can be round and of a diameter d, as shown, or they can be elliptical, beveled, or of some other configuration. Diameter d of metallic hub 12 is generally greater than or equal to thickness h of metallic hub 12.

Polymeric ring 14 is an elastically deformable continuous element being substantially planar and dimensioned and configured to accommodate metallic hub 12 within the boundaries thereof. Typically, polymeric ring 14 is a toroid-shaped element having a rectangular cross section. An inner curved surface 22 defines a surface configured and dimensioned to engage continuous edge surface 16 of metallic hub 12, and an opposing outer curved surface 24 defines a surface that can be machined to form any one of a myriad of finished pieces. In order to retain polymeric ring 14 on metallic hub 12, polymeric ring 14 is dimensioned such that the distance between diametrically opposed points on inner curved surface 22 is less than diameter d of metallic hub 12. Proper pressing and mounting of polymeric ring 14 onto metallic hub 12 typically requires the expansion of polymeric ring 14 in its planar dimensions using an application of heat or by the stretching of polymeric ring 14.

The bonding agent (not shown) is applied to continuous edge surface 16 of metallic hub 12 in order to further effectuate the adherence of polymeric ring 14 to metallic hub 12. The bonding agent is typically applied by the dipping of metallic hub 12 into the bonding agent, although other manners of application may be used. Other manners of application include, but are not limited to, spraying and direct application (e.g., using a roller, a brush, or some other type of applicator) of the bonding agent to coat continuous edge surface 16.

The bonding agent may be any one of a variety of different bonding agents. Preferred bonding agents, however, are those classified as organosilanes. Organosilanes form a durable chemical bridge between resins such as plastics and inorganic substrates such as metal or glass are typically used to adhere organic materials to inorganic substrates. One particular application of organosilanes is that of an adhesive to bond rear-view mirrors to automobile windshields. Excellent adhesive properties have been noted by a subclass of organosilanes known as aminopropylsiloxanes, such as those sold under the trademark SILQUEST by C.K. Witco Corp. of Greenwich, Conn.

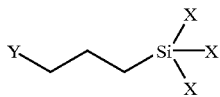

wherein Y is a group reactive with the organic compound that is to be bonded with metal and X is an alkoxy group.

Typically, the alkoxy group is either a methoxy group or an ethoxy group. As indicated, aminosilanes are generally preferred, wherein Y is a $NH_2$ or R—NH group, and aminopropylsiloxanes are especially preferred. Suitable aminosilanes include γ-Aminopropyltriethoxysilane, γ-Aminopropyltrimethoxysilane, N-(β-Aminoethyl)-γ-aminopropyltrimethoxysilane, N-(γ-Trimethoxysilylpropyl) diethylenetriamine, bis-(γ-Trimethoxysilylpropyl)amine, N-Phenyl-γ-aminopropyltrimethoxysilane, and N-(β-aminoethyl)-γ-aminopropyldimethoxymethylsilahie.

The organosilanes are most often obtained in concentrated form and generally must be diluted before being applied to metallic hub 12. Typically, when concentrated, an organosilane is cut back to about one percent to about ten percent on a weight per unit volume basis in order to facilitate its application to metallic hub 12. Typical solvents used for diluting the organosilane include, but are not limited to, water, various alcohols, methyl ethyl ketone, acetone, and the like. Once applied to metallic hub 12, the solvent evaporates and deposits a monatomic layer of the organosilane bonding agent on continuous edge surface 16. The ability of the organosilane to bond to metallic hub 12 is determined by the concentration of silane-philic reactive groups on the surface of metallic hub 12. Typically, the most reactive of such groups are silicon hydroxide, aluminum hydroxide, metal oxides, and metal hydroxides. Increased concentrations of such groups on continuous edge surface 16 of metallic hub promote the effective adhesion of polymeric ring 14 to metallic hub 12.

Because of the dimensioning of polymeric ring 14 and metallic hub 12, the engagement of polymeric ring 14 with metallic hub 12 is extremely tight. Polymeric ring 14 may, therefore, require an application of heat thereto in order to expand polymeric ring 14, thereby allowing polymeric ring 14 to be more easily fitted over metallic hub 12. The heat applied to polymeric ring 14 is such that polymeric ring 14 expands to a size that allows it to be fitted over metallic hub 12 with little or no mechanical stretching to form ring/hub assembly 10. Upon cooling of ring/hub assembly 10, polymeric ring 14 contracts to such a degree so as to cause polymeric ring 14 to be mechanically tight on metallic hub 12. The contraction causes a prestress force to be uniformly exerted on a circumference of metallic hub 12 by polymeric ring 14, which ensures that polymeric ring 14 is securely mounted over metallic hub 12. Once securely mounted, polymeric ring 14 can be machined.

Referring now to FIG. 2, polymeric ring 14 may be mechanically stretched without being heated to facilitate its mounting onto metallic hub 12. Mechanical stretching of polymeric ring 14 is typically performed with a ring stretching apparatus (not shown). Typically, polymeric ring 14 is partially fitted onto metallic hub 12 at a first point 26 on the circumference of metallic hub 12. Polymeric ring 14 is then stretched sufficiently such that it can be pulled over a second point 28 on metallic hub 12 that is diametrically opposed to first point 26. Upon stretching polymeric ring 14 to a size that allows for its unconstrained disposition around continuous edge surface 16 of metallic hub 12, the elastic deformation qualities of polymeric ring 14 allow it to conform to the outer dimensions of metallic hub 12, thereby causing the prestress forces to be exerted on continuous edge surface 16 of metallic hub 12.

Once polymeric ring 14 is mounted to metallic hub 12 to form ring/hub assembly 10, ring/hub assembly 10 is placed into an induction coil (not shown) or a similar device and heated. The induction coil or similar device should be capable of heating objects to high temperatures to cause the physical bonding of polymeric ring 14 to metallic hub 12. Heating allows for the softening and flow of the polymer into the textured outer surface, knurling, or splines disposed on continuous edge surface 16 of metallic hub 12. The temperature to which ring/hub assembly 10 can be raised is dependent upon the specific type of bonding agent and the specific materials of fabrication of the components of ring/hub assembly 10. After sufficient heating, ring/hub assembly 10 is cooled to room temperature to cause the softened polymer to harden, thereby bonding polymeric ring 14 to metallic hub 12.

Referring to FIG. 3, ring/hub assembly 10 is shown as having polymeric ring 14 mounted completely around metallic hub 12. Upon being fully assembled, polymeric ring 14 can be machined to produce any one of a myriad of pieces including, but not being limited to, a gear, a cam lobe, a spacer, a washer, a flywheel, a pulley, or a bushing. In FIG. 4, the finished piece is shown generally at 30 to be a gear. Gear 30 includes a plurality of teeth 32 formed in polymeric ring 14. Each tooth 32 is typically formed pursuant to design specifications adapted to the particular application of gear 30. A center portion 34 of metallic hub 12 is typically configured to have an opening 36 that facilitates the attachment of gear 30 to an axially rotatable shaft (not shown) or a similar device.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A gear production process for producing a finished gear, the gear production process comprising:
   producing a machinable polymer/metal blank, wherein producing the machinable polymer/metal blank includes:
   providing a polymer ring having an inner diameter;
   providing a metallic hub having an outer diameter greater than the inner diameter of the polymer ring, the metallic hub having an outer periphery with a texture;
   expanding the inner diameter of the polymer ring;
   surrounding the outer periphery of the metallic hub with the polymer ring;
   allowing the polymer ring to contract;
   heating the outer periphery of the metallic hub to soften an inner surface of the polymer ring through heat transferred from the metallic hub;
   biasing said polymer ring at said inner surface into the texture of the metallic hub;
   cooling said polymer ring until it hardens; and,
   machining an outer surface of said polymer ring with gear teeth to form the finished gear from the polymer/metal blank.

2. The process of claim 1, wherein the metallic hub is initially imperforate, the process further comprising providing a centrally located opening within the metallic hub for attaching the gear to an axially rotatable shaft.

3. The process of claim 1, wherein machining an outer surface of said polymer ring with gear teeth comprises ensuring that the polymer ring is first irremovably mounted over the metallic hub.

4. The process of claim 1, wherein expanding the inner diameter of the polymer ring includes mechanically stretching the polymer ring over the metallic hub.

5. The process of claim 4, wherein mechanically stretching the polymer ring comprises utilizing a ring stretching apparatus.

6. The process of claim 1, wherein expanding the inner diameter of the polymer ring includes applying heat to the polymer ring to expand the polymer ring to a size for fitting over the metallic hub.

7. The process of claim 6, further comprising cooling said polymer ring to contract the polymer ring so as to be mechanically tight on the metallic hub.

8. The process of claim 1, wherein heating the outer periphery of the metallic hub to soften an inner surface of the polymer ring comprises placing the polymer/metal blank into an induction coil.

9. The process of claim 1, wherein machining an outer surface of said polymer ring with gear teeth comprises providing a plurality of teeth spaced evenly about an entire periphery of the outer surface of said polymer ring.

10. The process of claim 1, further comprising, prior to surrounding the outer periphery of the metallic hub with the polymer ring, providing a layer of organosilane on the outer periphery of the metallic hub, wherein a first group of the chemical structure of organosilane is chemically bound to the metallic hub, and a second group of the chemical structure of organosilane, different than the first group, is chemically bound to the polymer ring.

11. A gear production process for producing a finished gear, the gear production process comprising:
   producing a machinable polymer/metal blank, wherein producing a machinable polymer/metal blank includes:
   providing a polymer ring having an inner diameter;
   providing a metallic hub having a continuous edge surface;
   texturing substantially all of the continuous edge surface for providing a textured outer surface;
   surrounding the textured outer surface of the metallic hub with the polymer ring;
   placing the polymer ring and metallic hub within an induction coil;
   heating the textured outer surface of the metallic hub with the induction coil to soften an inner surface of the polymer ring;
   biasing said polymer ring at said inner surface into the textured outer surface of the metallic hub;
   cooling said polymer ring until it hardens; and,
   machining an outer surface of said polymer ring with gear teeth to form the finished gear from the polymer/metal blank.

12. The process of claim 11, wherein the metallic hub is initially imperforate, the process further comprising providing a centrally located opening within the metallic hub for attaching the gear to an axially rotatable shaft.

13. The process of claim 11, wherein surrounding the outer periphery of the metallic hub with the polymer ring includes utilizing a ring stretching apparatus to mechanically stretch the polymer ring over the metallic hub.

14. The process of claim 11, wherein surrounding the outer periphery of the metallic hub with the polymer ring includes applying heat to the polymer ring to expand the polymer ring to a size for fitting over the metallic hub and subsequently cooling said polymer ring to contract the polymer ring so as to be mechanically tight on the metallic hub.

15. The process of claim 11, wherein machining an outer surface of said polymer ring with gear teeth comprises providing a plurality of gear teeth spaced evenly about an entire periphery of the outer surface of said polymer ring, each tooth in said plurality of gear teeth having a substantially square cross-sectional shape.

16. The process of claim 11, further comprising, prior to surrounding the outer periphery of the metallic hub with the polymer ring, providing a monatomic layer of organosilane on the outer periphery of the metallic hub, wherein a first group of the chemical structure of organosilane is chemically bound to the metallic hub, and a second group of the chemical structure of organosilane, different than the first group, is chemically bound to the polymer ring.

17. A gear production process for producing a finished gear, the gear production process comprising:
producing a machinable polymer/metal blank, wherein producing a machinable polymer/metal blank includes:
providing a polymer ring having an inner diameter;
providing a metallic hub having an outer diameter greater than the inner diameter of the polymer ring, the metallic hub having a continuous edge surface;
texturing substantially all of the continuous edge surface for providing a textured outer surface;
providing a layer of organosilane on the textured outer surface of the metallic hub, wherein a first group of the chemical structure of organosilane is chemically reactive with the metallic hub, and a second group of the chemical structure of organosilane, different than the first group, is chemically bound to the polymer ring;
expanding the inner diameter of the polymer ring;
surrounding the textured outer surface of the metallic hub with the polymer ring;
allowing the polymer ring to contract;
placing the polymer ring and metallic hub within an induction coil;
heating the outer surface of the metallic hub with the induction coil to soften an inner surface of the polymer ring;
biasing said polymer ring at said inner surface into the textured outer surface of the metallic hub;
cooling said polymer ring until it hardens; and,
machining an outer surface of said polymer ring with a plurality of gear teeth spaced evenly about an entire periphery of the outer surface of said polymer ring to form the finished gear from the polymer/metal blank, wherein machining each tooth in said plurality of gear teeth comprising machining a substantially square cross-sectional shape for each tooth.

18. The process of claim 17, wherein the metallic hub is initially imperforate, the process further comprising providing a centrally located opening within the metallic hub for attaching the gear to an axially rotatable shaft.

19. The process of claim 17, wherein expanding the inner diameter of the polymer ring includes utilizing a ring stretching apparatus to mechanically stretch the polymer ring over the metallic hub.

20. The process of claim 17, wherein expanding the inner diameter of the polymer ring includes applying heat to the polymer ring to expand the polymer ring to a size for fitting over the metallic hub and subsequently cooling said polymer ring to contract the polymer ring so as to be mechanically tight on the metallic hub.

* * * * *